United States Patent [19]
Imhof

[11] 3,768,455
[45] Oct. 30, 1973

[54] IGNITION ARRANGEMENT FOR INTERNAL COMBUSTION ENGINE

[75] Inventor: Gerhard Imhof, Rothenbach, Germany

[73] Assignee: Robert Bosch G.m.b.H., Stuttgart, Germany

[22] Filed: May 7, 1971

[21] Appl. No.: 141,166

[30] Foreign Application Priority Data
May 20, 1970 Germany.................. P 20 24 474.0

[52] U.S. Cl........................... 123/148 E, 123/149 R
[51] Int. Cl............................. F02p 5/08, F02p 1/02
[58] Field of Search................................. 123/148 R

[56] References Cited
UNITED STATES PATENTS

| | | | |
|---|---|---|---|
| 3,630,185 | 12/1971 | Struber | 123/148 |
| 3,447,521 | 6/1969 | Piteo | 123/148 |
| 3,545,420 | 12/1970 | Foreman | 123/149 |
| 3,553,529 | 1/1971 | Strelow | 315/218 |
| 3,482,560 | 12/1969 | Hohne | 123/148 |
| 3,539,841 | 11/1970 | Riff | 310/811 |
| 3,554,179 | 1/1971 | Burson | 123/149 |
| 3,405,347 | 10/1968 | Swift | 322/91 |
| 3,515,109 | 6/1970 | Farr | 123/148 |
| 3,524,438 | 8/1970 | Janisch | 123/148 |

Primary Examiner—Laurence M. Goodridge
Assistant Examiner—Ronald B. M. Cox
Attorney—Michael S. Striker

[57] ABSTRACT

An electronic switch, which controls the sparking of a spark plug is triggered by a control circuit having an engine operated signal generator, the output of which increases with increasing engine r.p.m. and is rectified by a full wave bridge to produce two successive ripples, or rectified half waves, of which the ripple more in advance of top dead center has the smaller amplitude, the other ripple triggering the switch for all engine speeds from zero up to a predetermined speed at which the ripple more in advance of top dead center also has an amplitude sufficient to trigger the electronic switch, whereby the ignition is advanced for higher engine speeds. In a second embodiment, altogether four successive ripples are produced, the amplitude of a ripple being smaller, for a given engine r.p.m., as the ripple is more in advance of top dead center.

5 Claims, 10 Drawing Figures

INVENTOR
Gerhard IMHOF

BY his ATTORNEY

INVENTOR:
Gerhard IMHOF

BY

*Richard I. Stuker* his ATTORNEY

IGNITION ARRANGEMENT FOR INTERNAL COMBUSTION ENGINE

BACKGROUND OF THE INVENTION

The invention relates to an ignition arrangement for an internal combustion engine, the ignition arrangement having an electronic switch that comprises a control path between a control electrode and a reference electrode and a switching path between the reference electrode and an output electrode, an alternating current voltage delivered from an engine driven signal generator to the control path changing the conductivity of the switch when the threshold value is reached so as to deliver energy to the spark plug to spark the latter.

Since an ignition arrangement of this kind does not use switches with contacts to control the ignition, it cannot fail because of dirty, oily, or burned contacts.

SUMMARY OF THE INVENTION

An object of the invention is an ignition arrangement that advances the timing for higher engine speeds so as to insure efficient engine operation at all r.p.m.-s.

A further object of the invention is an ignition arrangement of the preceding object, which arrangement despite a simple circuit provides satisfactory operation.

Briefly, the invention consists of an electronic switch, such as a transistor or a thyristor, having a control electrode, a reference electrode and an output electrode, the control and reference electrodes constituting between themselves a control path, the reference and output electrodes constituting between themselves a swiching path, the switching path having a conductive state and a non-conductive state and being switched from one state to the other state whenever voltage of a certain polarity across the control path exceeds a threshold value, electrical storage means connected to the switch means and to the spark plug for supplying energy to the latter to provoke an ignition causing spark whenever conductivity of the switching path is changed from one state to the other state, a voltage generator coupled to the engine for generating an alternating current voltage having at least one absolute amplitude, the value of the amplitude increasing with increasing engine r.p.m., and full wave rectifying means, such as a bridge rectifier, having an alternating current input, connected to the output of the voltage generator and a pulsating direct current output of which two successive ripples corresponding to a full wave have different peak amplitudes, that ripple more in advance of top dead center having a peak amplitude that exceeds the threshold value only when the engine r.p.m. exceeds a predetermined value, that ripple less in advance of top dead center having a peak amplitude that exceeds the threshold value even when the engine r.p.m. is less than the predetermined value, the pulsating direct current output being connected to the control and reference electrodes so as to be connected across the control path.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
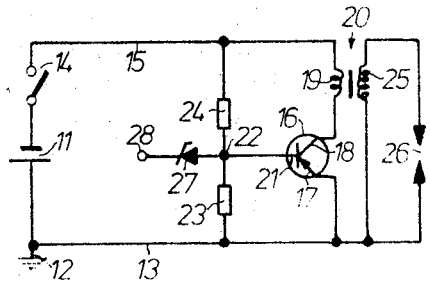
FIG. 1 is a circuit diagram of one embodiment of the ignition arrangement.

With reference to FIG. 1, the ignition arrangement of the invention comprises a direct current source 11, which can be, for example, the battery of the motor vehicle. The direct current source 11 is connected to a rail that is connected to ground at 12. A negative rail 15 is connected to the source 11 by an ignition switch 14. An electronic switch 16, composed of a pnp transistor, is connected by its emitter to the positive rail 13, by its collector 18 to one end of the primary winding 19 of the spark coil 20, the other end of the primary winding being connected to the negative rail 15, and by its base 21 to the junction 22 between two resistors 23 and 24 connected in series between the grounded rail 13 and the negative rail 15. The emitter, collector, and the base respectively constitute the reference electrode, the output electrode, and the control electrode. Within the electronic switch 16, the paths between the reference electrode 17 and the output electrode 18, on the one hand, and between the reference electrode 17 and the control electrode 21, on the other, are respectively a switching path and a control path. The secondary winding 25 of the spark coil 20 is connected across spark plug 26. The junction 22 is connected to the anode of a Zener diode 27, the cathode of which is connected to a control terminal 28.

Figure 2:
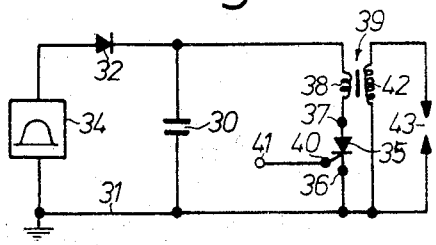
FIG. 2 is a circuit diagram of a second embodiment of the invention.

FIG. 2 shows a second embodiment of the ignition arrangement of the invention, this embodiment comprising a spark discharge capacitor 30, which is connected between the grounded rail 31 and the cathode of a rectifying diode 32. Connected between the anode of this diode and the grounded rail 31 is a charging unit 34, which, in a known manner, can be provided with electrical energy by a magnet and coil arrangement or by an arrangement that steps up a chopped direct current. In this embodiment, the electronic switch consists of a thyristor 35 of which the cathode 36 is connected to the grounded rail 31, the anode 37 is connected by the primary winding 38 of a spark coil 39 to the upper plate of the capacitor 30, and the gate 40 is connected to a control terminal 41. The cathode, anode, and gate respectively comprise the reference electrode, the output electrode, and the control electrode. Within the electronic switch 35, the paths between the reference electrode 36 and the output electrode 37, on the one hand, and between the reference electrode 36 and the control electrode 40, on the other, are respectively a switching path and a control path. The secondary winding 42 of the spark coil 39 is connected across the spark plug 43.

Figure 3:
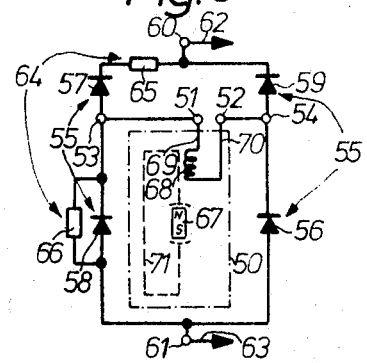
FIG. 3 is a circuit diagram of one embodiment of the control unit.
Figure 4:
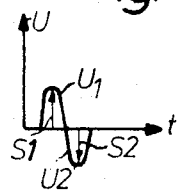
FIG. 4 is a voltage-time graph of the output of the signal generator of the control unit shown in FIG. 3.

FIG. 3 is a wiring diagram of one embodiment of a control unit for the ignition arrangement shown in either FIG. 1 or in FIG. 2. The unit comprises a signal generator 50 enclosed within the box formed by a dot-dash line. The signal generator, which is driven by the internal combustion engine, provides at its output terminals 51 and 52 an alternating current voltage of which the peak amplitudes S1 and S2 increase with increasing engine r.p.m. This output voltage, which occurs at the time that ignition is to take place, is shown in FIG. 4. The output terminals 51 and 52 are connected to the alternating current input terminals 53 and 54 of a full wave bridge rectifier 55. The bridge rectifier comprises four rectifying diodes 56, 57, 58 and 59 of which the diodes 56 and 57 conduct on the positive half waves U1, and the rectifying diodes 58 and 59 conduct on the negative half waves U2.

The bridge rectifier 55 has two direct current output terminals 60 and 61, the output terminal 60 being connected by a lead 62 to the control terminal 28 or 41 and the output terminal 61 being connected by a lead 63 to the reference electrode 17 or 36. The output voltage of the bridge rectifier is, of course, pulsating direct current.

The bridge rectifier further comprises a damping element 64 (to be described in detail) that reduces, at any given engine r.p.m., the peak amplitude S1′ of the first ripple U1′ of the two successive ripples U1′ and U2′ corresponding to half waves U1 and U2 of the unrectified input to the bridge. The first ripple U1′ is more in advance of top dead center than is the second ripple U2′.

Figure 5:
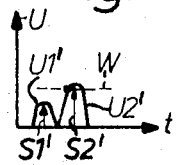
FIGS. 5 and 6 are voltage-time graphs of the output of the full wave bridge rectifier at two different engine speeds.
Figure 6:
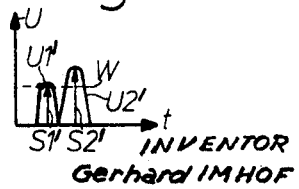

The switching path 17 – 18 (FIG. 1) is turned off by applying to the control terminal 28 a positive voltage at least equal in value to a definite threshold voltage. The switching path 36 – 37 (FIG. 2) is turned on when the voltage between the reference electrode 36 and the control terminal 41 is at least equal to the treshold value. In FIGS. 5 and 6, which plot voltage against time, the treshold value is shown by the dashed horizontal line W.

The control unit is so designed that the peak amplitude S1′ of the first ripple U1′ exceeds the threshold value W (FIG. 6) only when the engine r.p.m. exceeds a certain minimum, whereas the peak amplitude S2′ of the following ripple U2′ exceeds the value W even when the engine r.p.m. is below this minimum.

The damping element 64 can be a resistor 65, which is connected in series with either the diode 56 or 57 of the bridge 55, these two diodes being conductive for the first ripple U1′. In the specific embodiment shown in FIG. 3, the resistor 65 is connected in series with the diode 57. Instead of the resistor 65, or in addition to the resistor 65, there can be provided a resistor 66 that is shunted across one of the diodes 58 and 59 of the bridge, these two diodes being non-conductive for the first ripple U1′. In the embodiment illustrated, the resistor 66 is connected in parallel with the diode 58.

The signal generator 50 preferably has a magnet arrangement 67 and a winding 68, the ends of the latter constituting the output terminals 51 and 52, across which the alternating voltage U1, U2 appears when there is relative movement between the magnet arrangement 67 and the winding 68. In the embodiment illustrated, the winding 68 is supported by a stationary iron core 71, which is denoted by the dashed line, and the magnet arrangement 67 is rotated by the internal combustion engine.

If the control unit shown in FIG. 3 is connected to the ignition arrangement shown in FIG. 1, the combination operates in the following manner. When the engine is to be started up, the ignition switch 14 is closed, so that the voltage of the direct current source 11 appears across the two series connected resistors 23 and 24. The voltage at the junction 22 is sufficiently negative with respect to the voltage on the reference electrode 17 so that the electronic switch 16 conducts, and a current flows through the primary winding 19 of the spark coil 20. Since the r.p.m. of the engine is relatively low immediately after the engine is started up, the spark plug must be sparked just before the piston in the cylinder reaches top dead center, in order to insure efficient operation of the engine. The control unit, shown in FIG. 3, insures just this, because the ripple U1′ is less than the threshold value W at these low r.p.m.-s, whereas the ripple U2′, which occurs just before top dead center, equals or exceeds the threshold value. When the ripple U2′ exceeds the value W, which is fixed by the Zener diode 27, the Zener diode conducts; the ripple U1′ causes a voltage drop across the resistor 23 that biases the control electrode 21 so positive with respect to the reference electrode 17 that the switching path 17 – 18 is cut off. The flow of current through the primary winding 19 is stopped, and the magnetic energy stored in the field surrounding the spark coil 20 causes in the secondary winding 25 a high voltage pulse that causes a flash over in the gap of the spark plug 26 and thereby ignites the compressed fuel-air mixture in the cylinder of the internal combustion engine.

If a certain minimum engine r.p.m., as determined by the size of the engine, is exceeded, the ripple U1′ also rises above the threshold value W, the ignition now being advanced. The operation of the circuit is the same as when the ripple U2′ causes the ignition.

If the control unit shown in FIG. 3 is connected to the ignition arrangement shown in FIG. 2, the combination operates in the following manner. The ignition timing is accomplished in the same way as with the ignition arrangement shown in FIG. 1. In this embodiment, however, the switching path 36 – 37 of the electronic switch 35 must be made conductive in order to obtain ignition. The threshold value W is determined by the control path 36 – 40 of the thyristor 35; the control voltage must reach a definite value before the switching path 36 – 37 is turned on.

When the ripple U2′ or (if the minimum engine r.p.m. is exceeded) the ripple U1′ exceeds the threshold value W, the control electrode 40 is biased sufficiently positive with respect to the reference electrode 36 so that the switching path 36 – 37 conducts; the spark discharge capacitor 30, which has previously been charged by the charging unit 34 through the diode 32, can now discharge through the primary winding 38 of the spark coil 39. Consequently, there is induced in the secondary winding 32 a high voltage pulse that sparks the spark plug 43.

Figure 7:
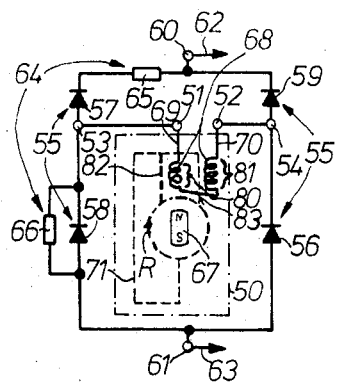
FIG. 7 is a circuit diagram of a second embodiment of the control unit.

The signal generator 50 of the control unit shown in FIG. 7 is a further development of that shown in FIG. 3. The reference numerals for the two embodiments, shown in FIGS. 3 and 7, are the same for all parts having the same function in both embodiments. These parts will not be further described.

Figure 8:
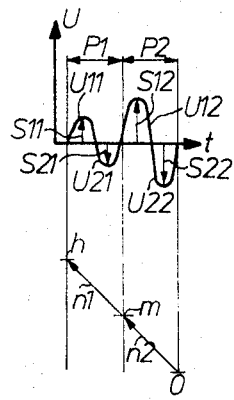
FIG. 8 is a voltage-time graph of the output of the signal generator of the control unit shown in FIG. 7.

In accordance with the invention, the coil, or winding 67, consists of a plurality of series connected winding sections, in the present embodiment two sections 80 and 81. As shown in FIG. 8 there is induced in the winding section 80 the complete alternating voltage cycle P1, and in the winding section 81 the cycle P2. The winding sections 80 and 81 are supported by respective yokes, which, with respect to the direction of rotation R of the magnet arrangement 67, are so spaced along the iron core 71 that the cycles P1 and P2 form an unbroken pair. In accordance with the invention provision is made to insure that the peak amplitude S11 and S21 of P1 (which is more in advance of top dead center than P2) is smaller than the peak amplitude S12 and S22 of the cycle P2, for any given r.p.m. of the engine. In the present embodiment, this provision consists of having a fewer number of turns for winding section 80 than for the section 81. The cycles P1 and P2 are associated with the respective ranges of engine r.p.m.-s n1 and n2, where n1 covers the range from a medium value m to a maximum value h, and n2 the range from zero to the medium value m. Moreover, the damping element 64 insures that the peak amplitude S11' of the first U11' of the two rectified half waves, or ripples, U11' and U21', associated with the period P1, exceeds the threshold value W only when the engine speed is greater than a vaue d1 within the range n1. The peak amplitude of the next ripple S21' exceeds the value W for all engine speeds within the range n1. Similarly, the damping element 64 also insures that the peak amplitude S12' of the first half wave U12' of the two rectified half waves U12' and U22', associated with the period P2, exceeds the value W only when the engine speed is greater than the value d2 within the range n2. The peak amplitude of the next ripple S22' is greater than the value W for all engine speeds down to zero.

Figure 9:
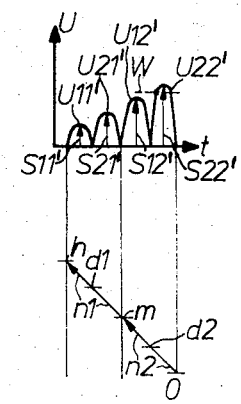
FIGS. 9 and 10 are voltage-time graphs of the output of the full wave bridge rectifier of the control unit, shown in FIG. 7, for two different engine speeds.
Figure 10:
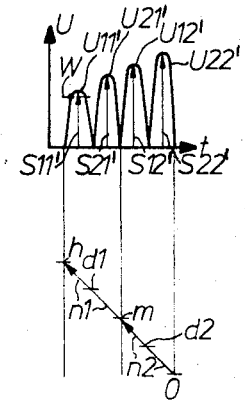

FIG. 9 graphically shows the amplitudes of the four ripples U11', U21', U12' and U22' when the engine r.p.m. is less than the value d2. The ripple U22 causes the ignition of the engine because it is only the amplitude of this ripple that exceeds the threshold value W. As the engine r.p.m. increases, the ripples U12', U21' and U11' successively cause ignition. FIG. 10 graphically shows the instance in which the ripple U11' causes ignition.

By dividing the winding into still more sections, the steps between successive advances and retardations of the spark can be made as small as desired, and the ignition timing can be adjusted in accordance with some suitable function.

It will be understood that each of the elements described above, or two or more together, may also find a useful application in other types of circuits differing from the types described above.

While the invention has been illustrated and described as embodied in an ignition arrangement for an internal combustion engine, it is not intended to be limited to the details shown, since various modifications and structural changes may be made without departing in any way from the spirit of the present invention.

Without further anlysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims.

I claim:

1. An ignition arrangement for an internal combustion engine having at least one spark-producing unit, comprising, in combination, an electronic switch having a control electrode, a reference electrode and an output electrode, said control and reference electrodes defining between themselves a control path, and said reference and output electrodes defining between themselves a switching path, said switch having a conductive state and a non-conductive state and being switched from one state to the other whenever the voltage across said control path reaches a predetermined threshold value;

electrical energy storing means connected to said switch and to the spark-producing unit for supplying energy to the latter to cause generation of an ignition spark when said switch undergoes a change from said one state to said other state.

A.C. voltage generator means coupled to the engine and operative for generating per combustion cycle at least two A.C. voltage cycles composed of four A.C. voltage half-cycles the first of which is generated in advance of top-dead-center and the second, third and fourth of which are generated in succession after the first;

full-wave rectifier means having an input connected to the output of said voltage generator means and having an output connected across said control path for applying said voltage half-cycles in full-wave rectified form, thereacross, and operative in cooperation with said generator means for causing all but the last of said half-cycles to have respective amplitudes reaching said threshold value only when the engine reaches respective predetermined successively lower sppeds and for causing the last of said half-cycles to have an amplitude at least equal to said threshold value when the engine speed is lower than the lowest of said successively lower speeds.

2. An arrangement as defined in claim 1, wherein said full-wave rectifier means comprises a bridge of four rectifier elements having an input connected to the output of said voltage generator means and having an output connected across said control path, and wherein said generator means comprises means operative for generating the second of said two A.C. voltage cycles of higher amplitude than the first of said A,C, voltage cycles.

3. An arrangement as defined in claim 2, wherein said rectifier means comprises a damping resistor connected in parallel with a one of said diodes which is conductive during half-cycles of one polarity, and a further damping resistor connected in series with a one of said diodes which is conductive during half-cycles of the opposite polarity.

4. An arrangement as defined in claim 1, wherein said voltage generator means comprises at least two spaced windings connected across the input of said full wave rectifier means and a rotating magnet for inducing said two successive A.C. voltage cycles in said two spaced windings.

5. An ignition arrangement as defined in claim 4, wherein said windings each have a different number of turns.

\* \* \* \* \*